United States Patent
Ross (10) Patent No.: US 10,908,900 B1
(45) Date of Patent: Feb. 2, 2021

(54) EFFICIENT MAPPING OF INPUT DATA TO VECTORS FOR A PREDICTIVE MODEL

(71) Applicant: GROQ, INC., Menlo Park, CA (US)

(72) Inventor: Jonathan Alexander Ross, Palo Alto, CA (US)

(73) Assignee: Groq, Inc., Mountain View, CA (US)

( * ) Notice: Subject to any disclaimer, the term of this patent is extended or adjusted under 35 U.S.C. 154(b) by 35 days.

(21) Appl. No.: 16/277,817

(22) Filed: Feb. 15, 2019

Related U.S. Application Data (60) Provisional application No. 62/633,051, filed on Feb. 20, 2018.

(51) Int. Cl.

| | |
|---|---|
| *G06F 9/305* | (2018.01) |
| *G06F 15/76* | (2006.01) |
| *G06F 12/00* | (2006.01) |
| *G06F 11/34* | (2006.01) |
| *G06N 20/00* | (2019.01) |
| *G06F 9/30* | (2018.01) |
| *G06F 15/173* | (2006.01) |
| *G06F 12/0864* | (2016.01) |
| *G06F 9/34* | (2018.01) |
| *G06F 15/80* | (2006.01) |
| *G06F 8/35* | (2018.01) |

(52) U.S. Cl.
CPC ...... *G06F 9/30036* (2013.01); *G06F 9/30029* (2013.01); *G06F 9/34* (2013.01); *G06F 12/0864* (2013.01); *G06F 15/17375* (2013.01); *G06F 8/35* (2013.01); *G06F 11/3447* (2013.01); *G06F 15/8053* (2013.01); *G06N 20/00* (2019.01)

(58) Field of Classification Search
CPC .... G06F 9/30036; G06F 9/30029; G06F 9/34; G06F 15/17375; G06F 15/8053; G06F 12/0864; G06F 16/2237; G06F 16/3347; G06F 16/3341; G06F 30/20; G06F 30/23; G06F 30/25; G06F 30/27; G06F 2212/454; G06F 8/35; G06F 11/3447; G06N 20/00; G06N 20/10; G06N 20/20
USPC ............... 712/2–9, 221–225, 227; 717/104; 706/12, 26, 27
See application file for complete search history.

(56) References Cited

U.S. PATENT DOCUMENTS

| | | | | |
|---|---|---|---|---|
| 9,690,938 | B1 * | 6/2017 | Saxe | G06F 21/563 |
| 2015/0379429 | A1 * | 12/2015 | Lee | G09B 5/00 706/11 |
| 2016/0337484 | A1 * | 11/2016 | Tola | H04L 63/0428 |
| 2017/0032281 | A1 * | 2/2017 | Hsu | G06N 5/04 |

\* cited by examiner

*Primary Examiner* — Daniel H Pan
(74) *Attorney, Agent, or Firm* — Fenwick & West LLP (57) ABSTRACT

A system may comprise a processor integrated circuit (IC) and a vector mapping sub-system that is separate from the processor IC and includes one or more ICs. The system may receive input data for processing by a predictive model and generate at least one memory address from the input data. At least one memory address may be provided to the vector mapping sub-system. The vector mapping sub-system generates a resulting vector of numbers based on the at least one memory address. The resulting vector can be a fixed length vector representation of the input data. The resulting vector is provided from the vector mapping sub-system to the processor IC. The processor IC executes one or more instructions for the predictive model using the resulting vector to generate a prediction. A corresponding method also is disclosed.

18 Claims, 8 Drawing Sheets

EFFICIENT MAPPING OF INPUT DATA TO VECTORS FOR A PREDICTIVE MODEL

CROSS REFERENCE TO RELATED APPLICATIONS

This application claims the benefits of U.S. Provisional Application No. 62/633,051 filed on Feb. 20, 2018, which is hereby incorporated by reference in its entirety.

BACKGROUND

Computing systems, such as systems designed for executing predictive models, may process a large amount of data and perform a large number of computing operations. Die space and communication bandwidth constraints can create various challenges in the design of these computing systems.

SUMMARY

Embodiments relate to a system and method for processing input data for a predictive model. In some embodiments, the system comprises a processor integrated circuit (IC) and a vector mapping sub-system that is separate from the processor IC and includes one or more ICs. The vector mapping sub-system receives from the processor IC at least one memory address generated from the input data, and generates a resulting vector of numbers based on the at least one memory address, the resulting vector being a fixed length vector representation of the input data. The vector mapping sub-system provides the resulting vector to the processor IC, where the processor IC is configured to execute one or more instructions for the predictive model using the resulting vector to generate a prediction.

In accordance with some embodiments, a method comprises receiving, at a processor IC, input data for processing by a predictive model, and generating at least one memory address from the input data. The method may further comprise providing the at least one memory address to a vector mapping sub-system that is separate from the processor IC, and generating, by the vector mapping sub-system, a resulting vector of numbers based on the at least one memory address, the resulting vector being a fixed length vector representation of the input data. The method may further comprise providing the resulting vector from the vector mapping sub-system to the processor IC, and executing, by the processor IC, one or more instructions for the predictive model using the resulting vector to generate a prediction.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

One or more embodiments disclosed herein may relate to improved mapping of input data to vectors for execution of a predictive model. Specialized processor integrated circuits (ICs) are being developed to execute predictive models, such as machine learning (ML) models. The predictive models can be executed more efficiently when they are designed to handle input data that is in a condensed fixed length vector format, as opposed to a sparse vector format or variable length format. The input data can be converted into the condensed fixed length vector format through a process that is sometimes referred to as a word embedding process or data embedding process. In one or more example embodiments described herein, a database of vectors may be used for this embedding process and may be stored in a vector mapping sub-system that may be separate from the processor IC (e.g., a co-processor IC) itself. This can free up die space on the processor IC and allow for additional execution units or other circuits to be added to the processor IC, thereby increasing the processing performance of the processor IC.

Moving the database of vectors to the vector mapping sub-system also introduces problems with returning the vectors to the processor IC over a bandwidth constrained communication channel. In one or more embodiments described herein, if multiple vectors are retrieved by the vector mapping sub-system for the input data, these vectors can be combined into a single resulting vector. This single resulting vector is then returned to the processor IC instead of returning all of the individual vectors back to the processor IC. This decreases the bandwidth requirements of the communication channel by making more efficient use of the communication channel.

One or more example embodiments disclosed herein may include a system for processing of input data for a predictive model. The system comprises a processor IC and a vector mapping sub-system that is separate from the processor IC and includes one or more ICs. The vector mapping sub-system is configured to receive from the processor IC at least one memory address generated from the input data and to generate a resulting vector of numbers based on the at least one memory address, the resulting vector being a fixed length vector representation of the input data. The vector mapping sub-system provides the resulting vector to the processor IC, and the processor IC is configured to execute one or more instructions for the predictive model using the resulting vector to generate a prediction.

The memory addresses may include multiple memory addresses for different portions of the input data. For example, a first memory address may be generated from a first portion of the input data and a second memory address may be generated from a second portion of the input data. In this situation, the vector mapping sub-system is configured to generate the resulting vector by retrieving a first vector of numbers from at least one memory of the vector mapping sub-system using the first memory address. The vector mapping sub-system retrieves a second vector of numbers from the at least one memory of the vector mapping sub-system using the second memory address. The vector mapping sub-system also mathematically combines (e.g., adding, subtracting, multiplying, dividing, convoluting) at least the first vector and the second vector into the resulting vector.

Example Computing System

Figure 1:
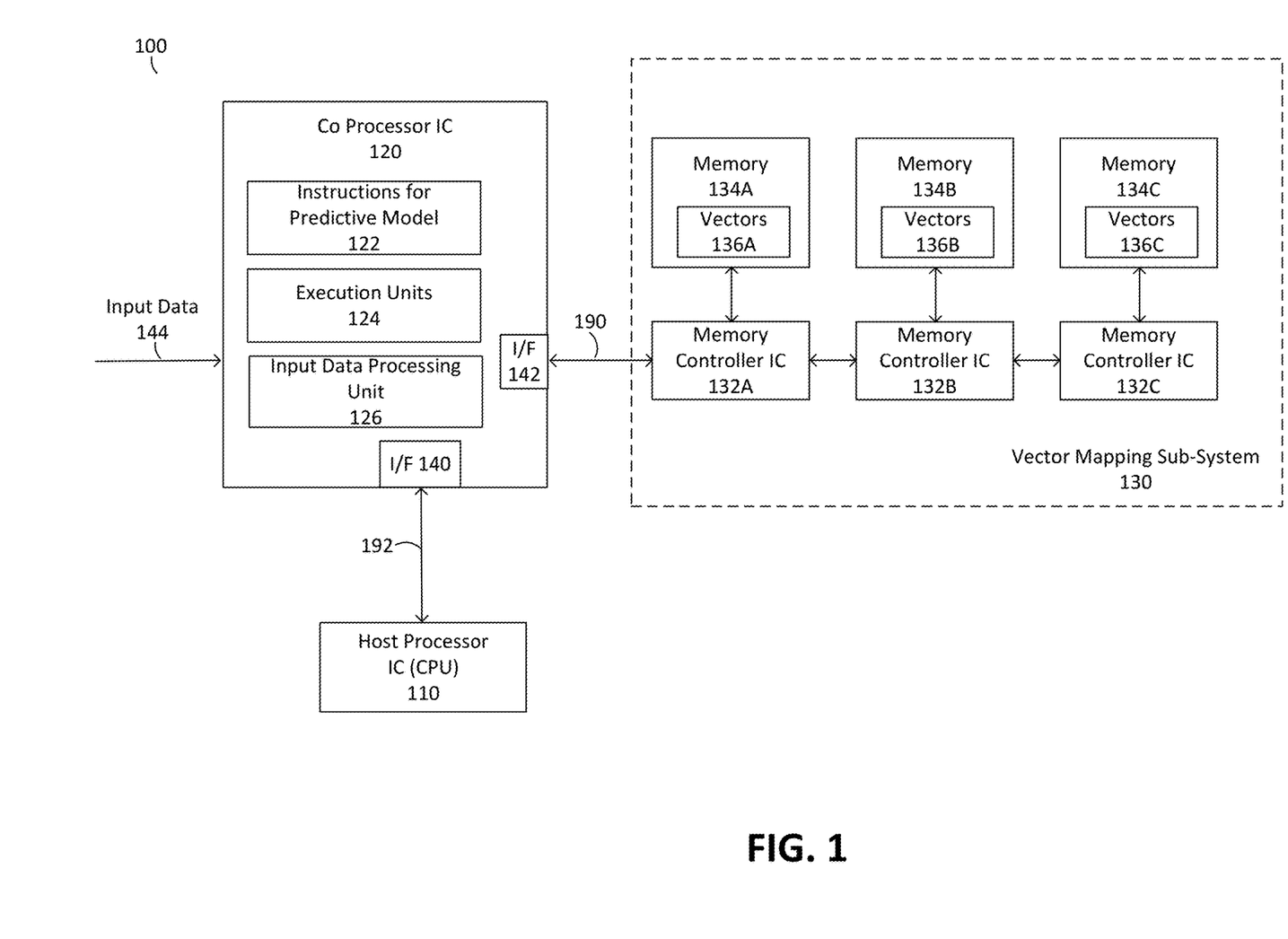
FIG. 1 is a block diagram of a computing system supporting mapping of input data to a resulting vector and the use of the resulting vector for executing instructions for a predictive model, according to one or more embodiments of the present disclosure.

FIG. 1 is a block diagram of a computing system supporting mapping of input data to a resulting vector and the use of the resulting vector for executing instructions for a predictive model, according to one or more embodiments of the present disclosure. The computing system 100 includes a host processor integrated circuit (IC) 110 such as a central processing unit (CPU), a co-processor IC 120, and a vector mapping sub-system 130. The components within the system 100 may be different components within the same computing device.

The co-processor IC 120 may be a specialized processor IC which supplements the functionality of the host processor IC 110. The co-processor 120 includes an interface circuit 140 for communicating with the host processor IC via a communication channel 192. In some embodiments, the co-processor IC 120 and the host processor IC 110 can be the same processor IC.

The co-processor IC 120 may be designed to execute instructions 122 for a predictive model to generate a prediction. A predictive model is any model which is configured to make a prediction from input data. Prediction is used in the general sense and is intended to include predictions, inferences, and other outputs from machine learning models. In one specific embodiment, a predictive model is a machine learning model. The predictive model may be designed to only accept input data in a specific vector format.

The co-processor IC 120 receives input data 144 for processing by the predictive model. The input data 144 can be discrete input data that has a variable length or a fixed length. In one specific embodiment, the input data 144 represents a text string that includes one or more words. An example of a text string is "acme store." In another embodiment, the input data 144 represents a text string that is a URL. An example of a URL is "http://www.acme.com." In another embodiment, the input data 144 can represent sensor data from a sensor, such as data for temperature, humidity, or sunlight.

The input data 144 in its received format may not be processed directly by a predictive model because the predictive model expects the input data 144 to be formatted as an input vector (e.g., [13, 23, 56, 3, 4, . . . 7]) with a certain fixed length (e.g., 400 numbers long). As used herein, a vector generally refers to a vector of numbers. To facilitate converting the input data 144 into a fixed length vector, the input data processing unit 126 generates one or more memory addresses from the input data 144. The memory addresses can represent memory locations where vectors for the input data are stored.

The input data processing unit 126 can use a hash function to hash the input data into a memory address. Alternatively, the input data processing unit 126 may divide the input data 144 into different data portions, and use the hash function to hash each data portion into a different memory address. In other embodiments, the input data processing unit 126 may use a look up table to look up the memory address(es) using the input data 144. In some embodiments, the input data processing unit 126 may be in a separate IC such as the host processor IC 110. The input data processing unit 126 may be implemented with logic circuits.

The interface circuit 142 provides, via a communication channel 190, the memory address(es) to a vector mapping subsystem 130 that is separate from the co-processor IC 120 and host processor IC 110. The communication channel 190 may be a wired communication channel that includes one or more wires. The communication channel 190 may be a serial or parallel communication channel.

The vector mapping subsystem 130 may include one or more memory controller ICs 132A-132C and memories 134A-C that store a large number of vectors 136A-C. The vectors 136 may be referred to as word embeddings that are dense vector representations of words. Each word embedding may be a few hundred numbers in length. The memory controller ICs 132 use the memory address(es) to retrieve the appropriate vector(s) 136 and generate a resulting vector that is a fixed length vector representation of the input data 144, thereby completing the process of mapping the input data 144 to its vector representation. The resulting vector is fixed length since it has a fixed number of elements (e.g., 400 elements) regardless of the content of the input data 144. The resulting vector may also be referred to as a mapped input data vector.

If there is a single memory address, a single retrieved vector may be used as the resulting vector. If there are multiple memory addresses, multiple vectors may be retrieved from different memory addresses and then combined into a single resulting vector by the vector mapping sub-system 130. The retrieved vectors and the resulting vector all have the same fixed length (e.g., the same number of elements). The vector mapping subsystem 130 then provides the resulting vector to the co-processor IC 120.

Beneficially, because there can be a large number of possible vectors 136 that the input data 144 can map to, storing these vectors 136 in the vector mapping sub-system 130 instead of the co-processor IC 120 can free up additional die space on the co-processor IC 120. This allows additional execution units 124 or other circuits to be added to the co-processor IC, thereby increasing the processing performance of the co-processor IC 120. Additionally, because the communication channel 190 may have limited bandwidth and the size of a vector can be quite large (e.g., 400 elements long), combining multiple vectors into a single resulting vector, and then transmitting the single resulting vector via the communication channel 190 can make more efficient use of the communication channel 190.

The co-processor IC 120 receives the resulting vector and the execution units 124 execute the instructions for the predictive model 122 using the resulting vector. The resulting vector is provided as an input to the execution units 124 during execution of at least some of the instructions 122. The execution units 124 can include circuits that perform various operations required by the instructions 122, such as vector-matrix multiplications, matrix-matrix multiplications, convolutions, vector operations, and other operations. The result of executing the instructions 122 is an output prediction of the predictive model.

Example Mapping of Input Data to Vector

Figure 2:
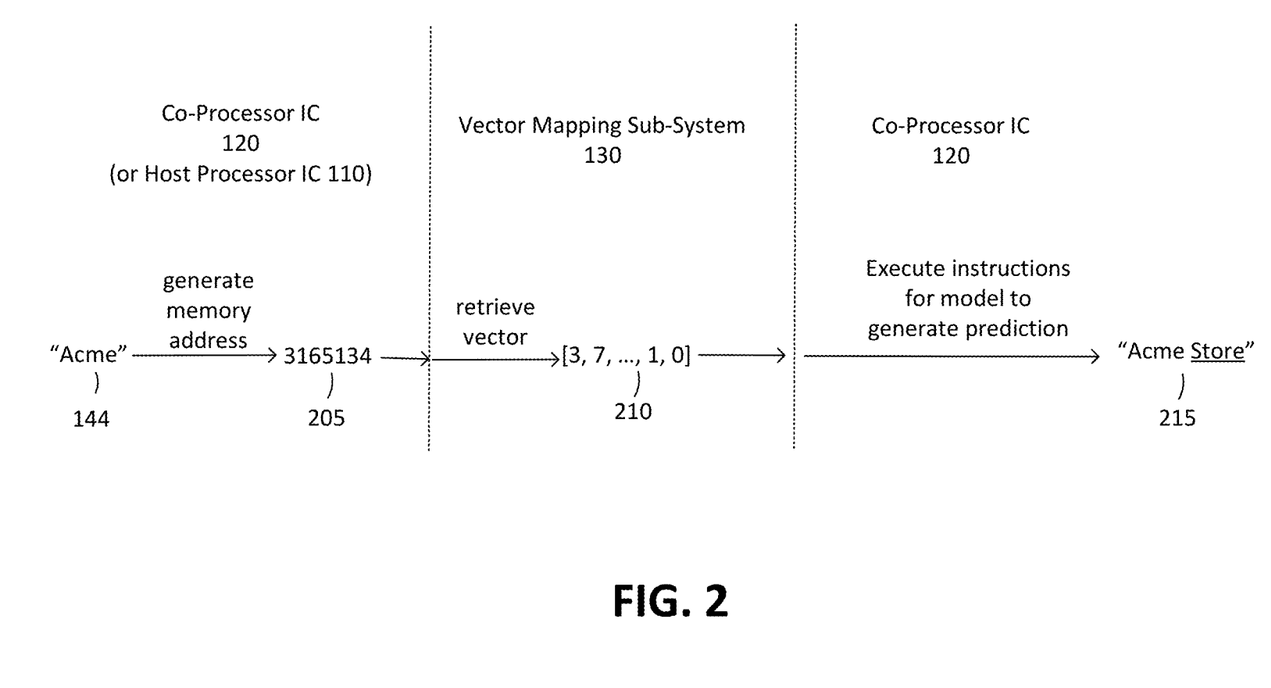
FIG. 2 is one example of mapping input data to a resulting vector, and the use of the resulting vector for executing instructions for a predictive model, according to one or more embodiments of the present disclosure.

Referring now to FIG. 2, illustrated is an example of mapping input data to a resulting vector, and the use of the resulting vector for executing instructions for a predictive model, according to one or more embodiments of the present disclosure.

The input data 144 is the text string "Acme." The input data 144 may be text that the user is entering into a search query box. The co-processor IC 120 receives the input data 144 and generates a memory address 205 from the text string "Acme." For example, a hash function can be used to hash the input data 144 into the memory address 205.

The co-processor IC 120 provides the memory address 205 to the vector mapping sub-system 130. The vector mapping sub-system 130 uses the memory address 205 to retrieve a vector 210 from memory. Here, vector 210 represents a resulting vector which is a vector representation of the input data 144.

The vector 210 is provided to the co-processor IC 120. The co-processor IC 120 executes instructions for the predictive model using the vector 210 to generate a prediction 215. Here, the prediction 215 is "Acme store", which represents a complete phrase that the user is likely to be entering into the search query box.

Figure 3:
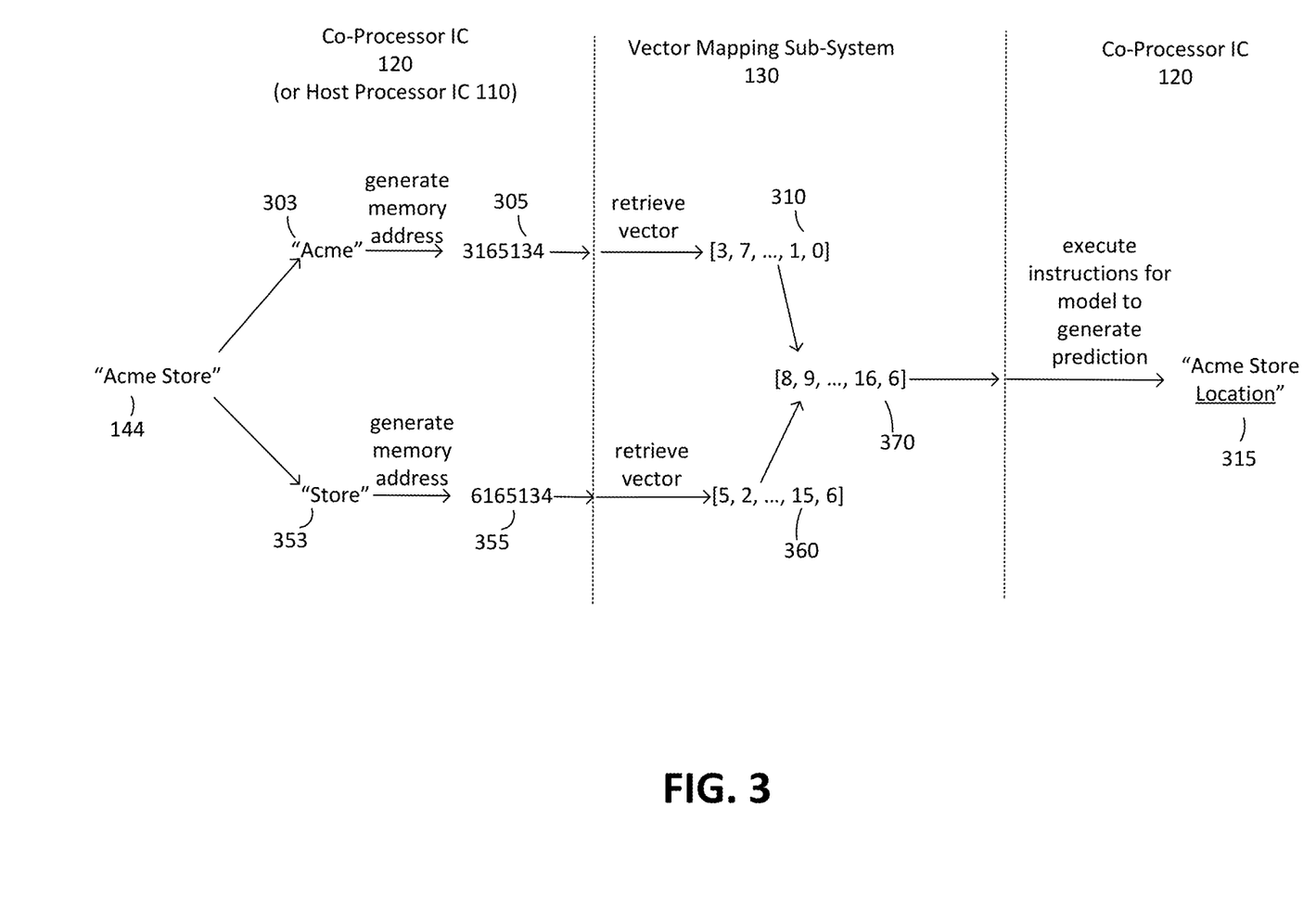
FIG. 3 is another example of mapping input data to a resulting vector, and the use of the resulting vector for executing instructions for a predictive model, according to one or more embodiments of the present disclosure.

FIG. 3 is another example of mapping input data to a resulting vector, and the use of the resulting vector for executing instructions for a predictive model, according to one or more embodiments of the present disclosure.

Here, the input data 144 is the text string "Acme store." The input data 144 may be text that the user is entering into a search query box. The co-processor IC 120 receives the input data 144. The co-processor IC 120 divides the input data 144 into two or more segments based upon features of the input data (e.g., a predetermined character in the input data), such as two separate words that are separated by a space. The first word 303 is "Acme" and the second word 353 is "store." A memory address 305 is generated from the word 303 of "Acme." A memory address 355 is generated 205 from the word 353 of "store." The memory addresses 305 and 355 may be generated with the same hash function.

The co-processor IC 120 provides the memory addresses 305 and 355 to the vector mapping sub-system 130. The vector mapping sub-system 130 uses the first memory address 305 to retrieve a vector 310 from memory. Here, vector 310 is a vector representation of the word 303 "Acme." The vector mapping sub-system 130 uses the second memory address 355 to retrieve a vector 360 from memory. Here, vector 360 is a vector representation of the word 353 "store."

The vectors 310 and 360 may retrieved from the same memory 134 or different memories 134, depending on their memory addresses. For example, referring to both FIGS. 1 and 3, memory controller IC 132A may retrieve both vectors 310 and 360 from its own local memory 134 using memory addresses 305 and 355. Alternatively, memory controller IC 132A may retrieve vector 310 from memory 134A using memory address 305, while memory controller 132B may retrieve vector 360 from memory 134B using memory address 355.

Referring back to FIG. 3, the two vectors 310 and 360 are then combined by aggregating (e.g., adding) the two vectors together. The combination of the two vectors produces a resulting vector 370. The resulting vector 370 is a vector representation of the input data 144. All three vectors 310, 360 and 370 have the same fixed length.

The resulting vector 370 is provided to the co-processor IC 120. The co-processor IC 120 then executes instructions for the predictive model using the vector 370 to generate a prediction. Here, the prediction is "Acme store location", which represents a complete phrase that the user is likely to be entering into the search query box. Another example of a prediction that can be made from the input data 144 of "Acme store" can be a prediction of the Acme store that is closest to the user's current location.

The process shown in FIG. 3 can produce a resulting vector 370 that does not account for the ordering of words in the input data 144. For example, regardless of whether the input data 144 is "Acme store" or "store Acme", the resulting vector 370 is the same. In one embodiment, the co-processor IC 120 (or host processor IC 110) can preserve information about the ordering of words by appending to each word additional text, e.g., a number, that indicates the order of the word in the input data 144. For example, "Acme" is the first word in the input data 144 while "store" is the second word in the input data 144. An extended word of "Acme;1" can be generated from the word "Acme" by appending ";1" to the end of the word. An extended word of "Store;2" can be generated from the word "Store" by appending ";2" to the end of the word. The extended words are then used to generate the memory addresses 305 and 355.

Referring back to FIG. 1, as previously mentioned, the vector mapping subsystem 130 may include several serially connected memory controller ICs 132A-C. Memory controller ICs 132 closer to the co-processor IC 120 are referred to as being upstream, while memory controller ICs 132 further from the co-processor IC 120 as referred to as being downstream. Each memory controller IC 132 controls data access to a corresponding memory 134. For example, memory controller IC 132A controls data access to memory 134A, memory controller IC 134B controls data access to memory 134B, and memory controller IC 132C controls data access to memory 134C.

Each memory 134 can be comprised of one or more dynamic random access (DRAM) ICs that store data in DRAM cells. Each memory 134 stores a different set of vectors 136. Memory 134A stores a set of vectors 136A, memory 134B stores a set of vectors 136B, and memory 134C stores a set of vectors 136C. In some embodiments, a memory 134 and memory controller IC 132 can be on the same IC.

Example Memory Controller

Figure 4:
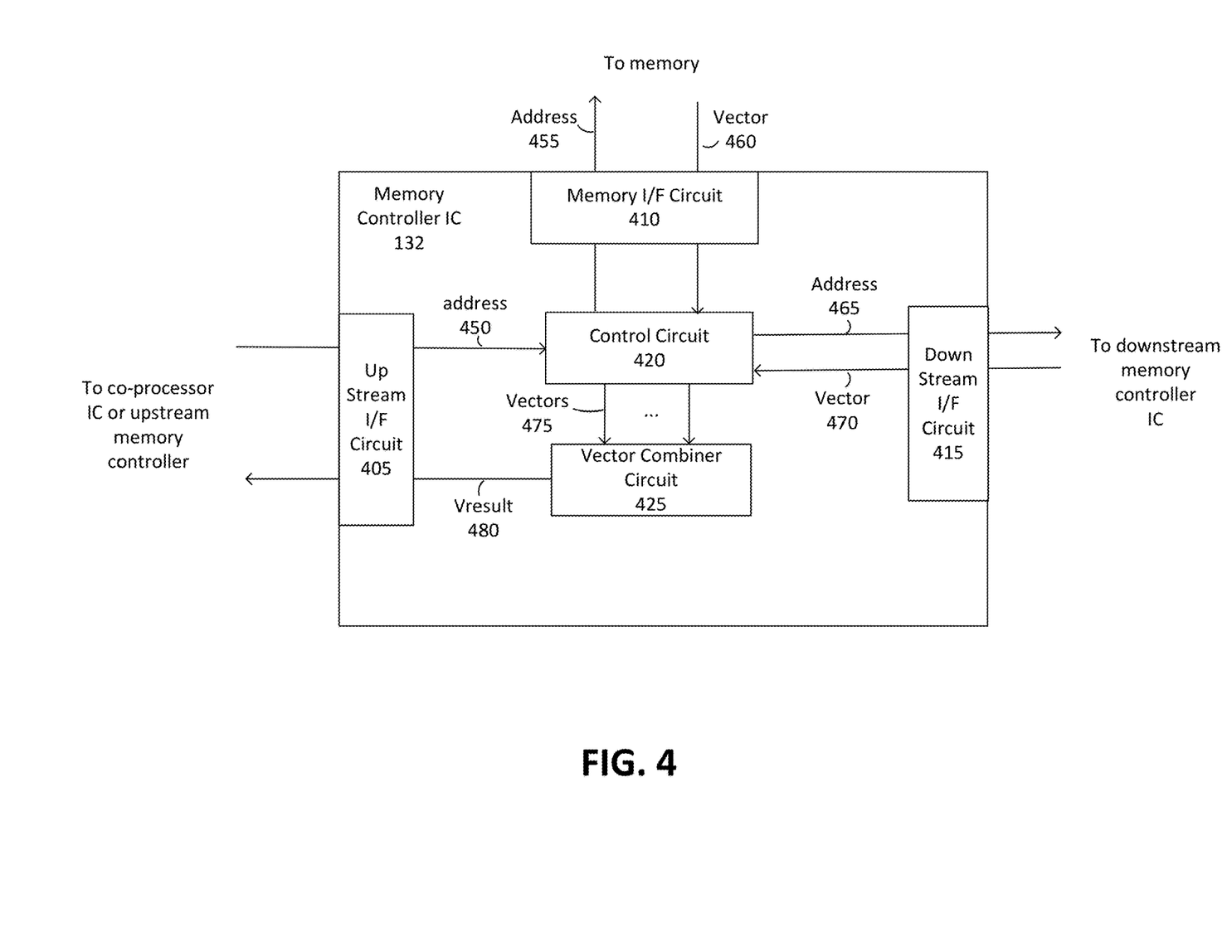
FIG. 4 is a detailed block diagram of a memory controller IC, according to one or more embodiments of the present disclosure.

FIG. 4 is a detailed block diagram of a memory controller IC 132, according to one or more embodiments of the present disclosure. The memory controller IC 132 includes an upstream interface circuit 405, a memory interface circuit 410, a downstream interface circuit 415, a control circuit 420, and a vector combiner circuit 425.

The upstream interface circuit 405 receives a memory address from the co-processor IC or from an upstream memory controller. The control circuit 420 determines whether the memory address 450 is in an address range supported by the memory controller IC 132. If so, the memory interface circuit 410 provides the memory address 450 to the memory as a memory address 455, and the memory returns a vector 460 stored at the memory address 455. In some embodiments, the control circuit 420 may translate the address 450 into a translated address and such that the memory address 455 is a translated address. If the memory address 450 is not in an address range supported by the memory controller IC 132, the downstream interface circuit 415 provides the memory address 450 to a downstream memory controller IC as memory address 465.

The downstream interface circuit 415 can receive a vector 470 from a downstream memory controller IC. The control circuit 420 can include a buffer (not shown) that temporarily stores vectors 460 and 470. Once all the vectors have been received for the memory addresses for a particular piece of input data 144, the control circuit outputs those vectors 475 to the vector combiner circuit 425.

The vector combiner circuit 425 combines the vectors 475 using mathematical or logical operations, and outputs the result as a resulting vector 480. In one embodiment, the vector combiner circuit performs an ADD operation on the individual vectors 475 to generate a resulting vector 480. In another example embodiments, the vector combiner circuit performs other operations, for example, subtraction, multiplication, bitwise AND, bitwise OR, or vector cross product on the vectors 475, or some combination thereof. The operations are configured such that the vectors 475 and the resulting vector 480 all have the same fixed length. In one example embodiment, the operation is a binary operation, which is an operation that combines two vectors to produce another vector. If there is only one memory address for the input data 144, the vector combiner circuit 425 may not be needed. The upstream interface circuit 405 then provides the resulting vector 480 to an upstream memory controller IC or the co-processor IC.

Examples of Operations for Mapping

Figure 5A:
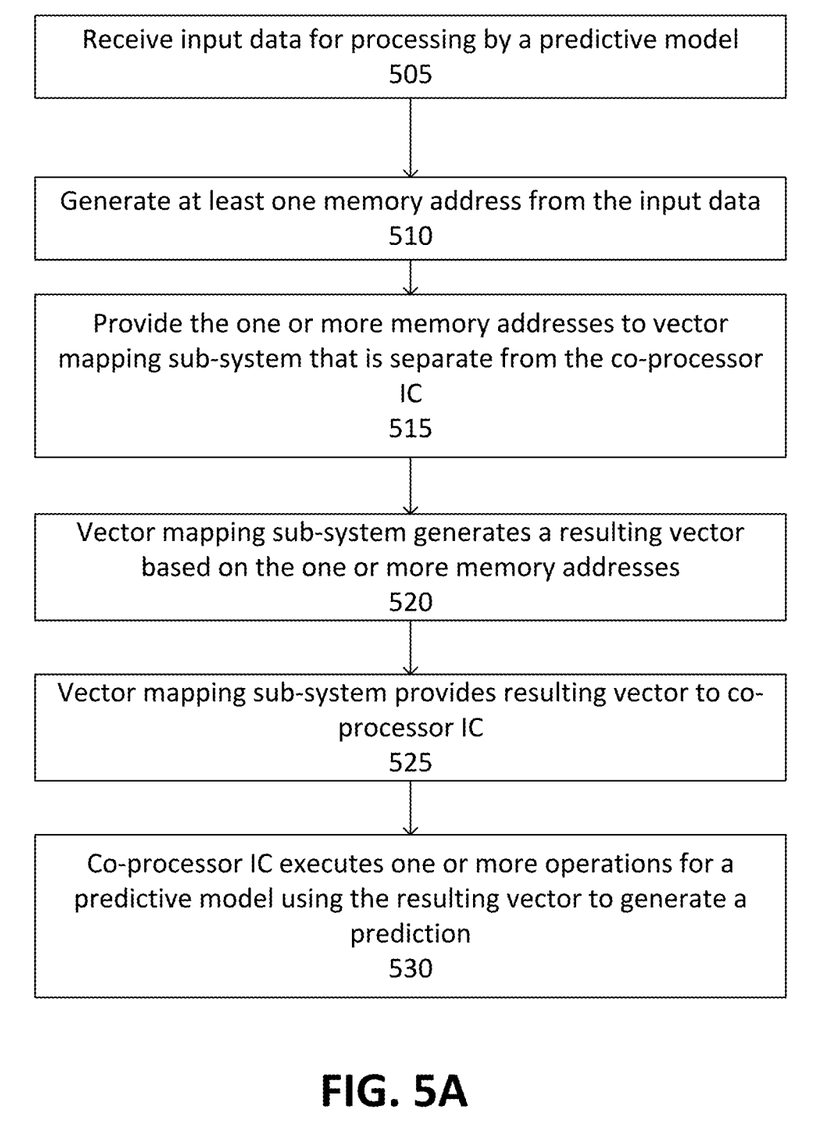
FIG. 5A is a flowchart illustrating a method of mapping input data to a resulting vector in a computing system and the use of the resulting vector for executing instructions for a predictive model, according to one or more embodiments of the present disclosure.

FIG. 5A is a flowchart illustrating a method of mapping input data to a resulting vector in a computing system and the use of the resulting vector for executing instructions for a predictive model, according to one or more embodiments of the present disclosure. In step 505, input data 144 for processing by a predictive model is received by the co-processor IC 120. In step 510, the co-processor IC 120 generates at least one memory address from the input data 144. In some embodiments, steps 505 and 510 can be performed by the host processor IC 110.

In step 515, the one or more memory addresses are provided by the co-processor IC 120 to the vector mapping sub-system 130. The vector mapping sub-system 130 is separate from the co-processor IC and may include one or more additional ICs. In step 520, the vector mapping sub-system 130 generates a resulting vector based on the one or more memory addresses. The resulting vector is a fixed length vector representation of the input data 144 that has a fixed number of elements (e.g., 400 elements) in the vector. In step 525, the vector mapping sub-system 130 provides the resulting vector to the co-processor IC 120. In step 530, the co-processor IC 120 executes one or more instructions 122 for the predictive model using the resulting vector to generate a prediction.

Figure 5B:
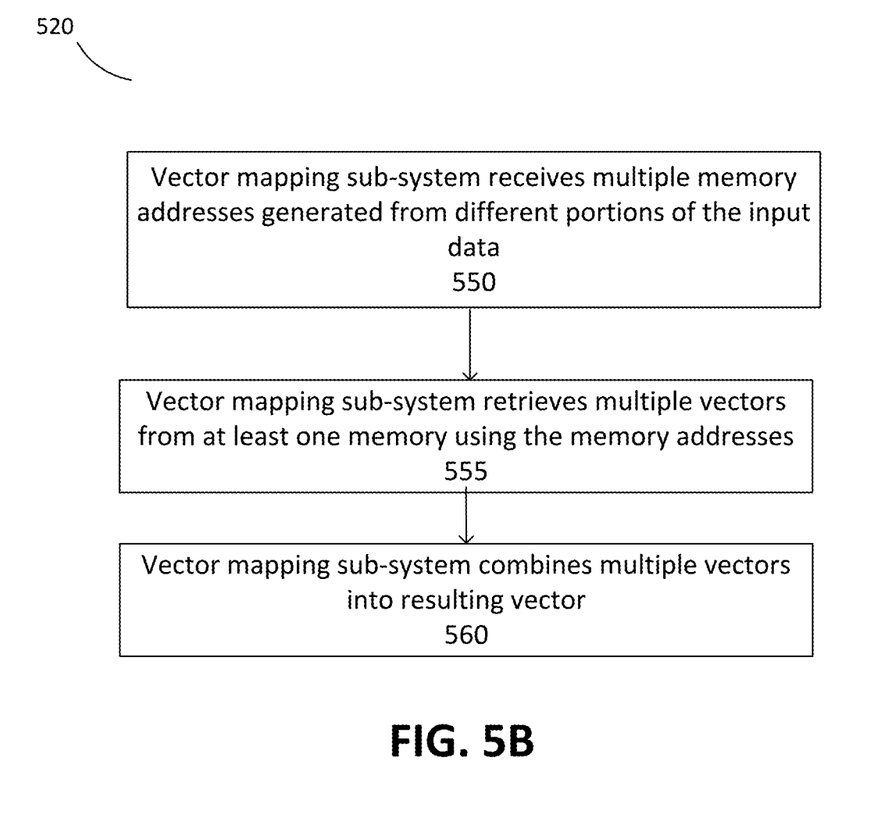
FIG. 5B is a flowchart illustrating the details of generating a resulting vector by the vector mapping sub-system from FIG. 5A when there are multiple memory addresses, according to one or more embodiments of the present disclosure.

FIG. 5B is a flowchart illustrating the details of the step 520 of generating a resulting vector by the vector mapping sub-system 130 from FIG. 5A when there are multiple memory addresses, according to one or more embodiments of the present disclosure. In step 550, the vector mapping sub-system receives multiple memory addresses from the co-processor IC 120. The addresses are generated from different data portions of the input data 144. For example, there can be one address generated from the word "Acme" in the input data 144 and another address generated from the word "store" in the input data 144.

In step 555, the vector mapping sub-system 130 retrieves multiple vectors from at least one memory 134 using the memory addresses. For example, one vector can be retrieved using one memory address, and another vector can be retrieved using another memory address. The vectors can be retrieved using the same or different memory controller ICs 132, and the vectors can be retrieved from the same or different memories 134. In step 560, the vector mapping sub-system 130 combines the multiple vectors into the resulting vector.

Figure 6:
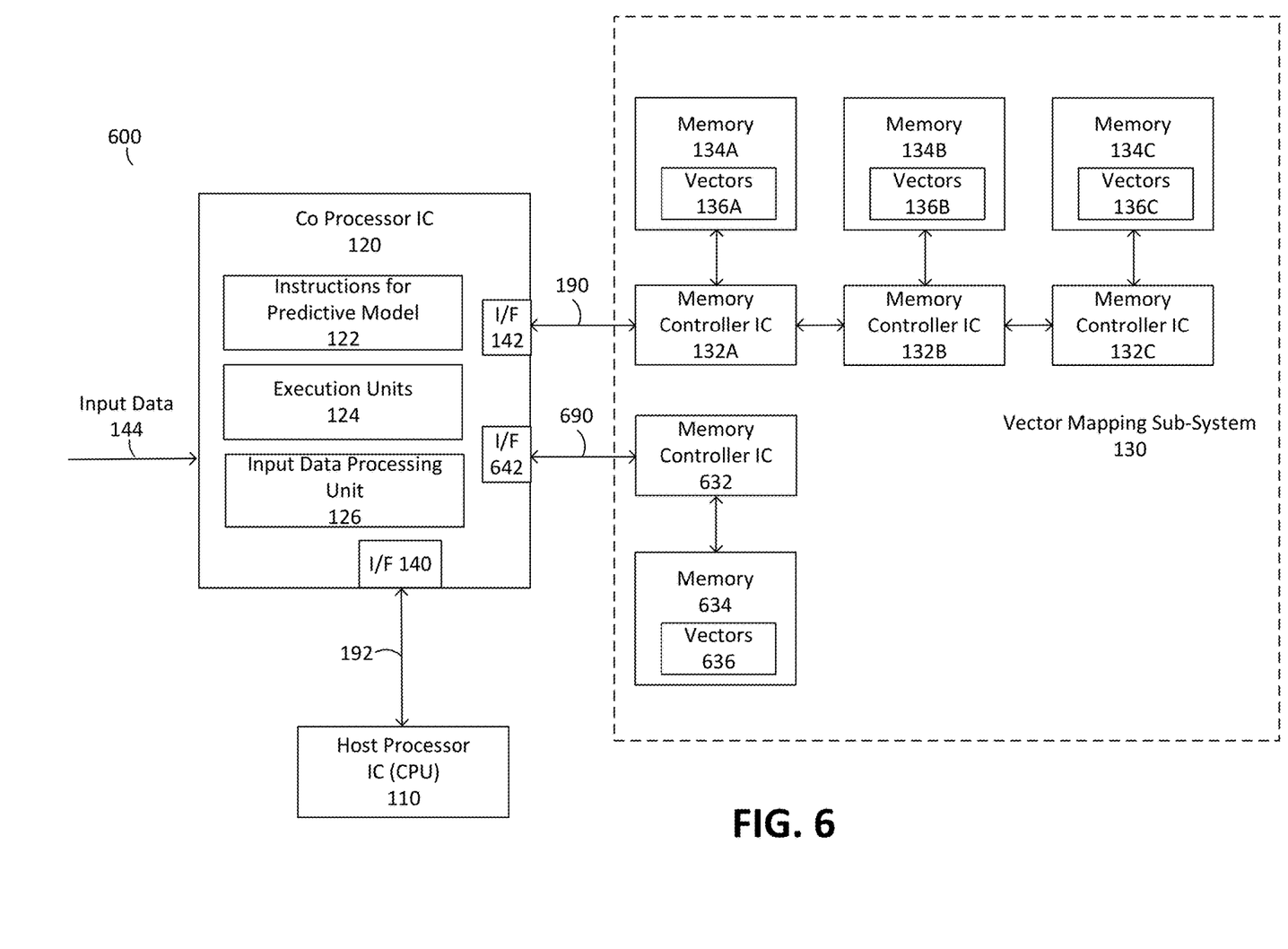
FIG. 6 is a block diagram of a computing system supporting mapping of input data to a resulting vector and the use of the resulting vector for executing instructions for a predictive model, according to another embodiment of the present disclosure.

FIG. 6 is a block diagram of a computing system 600 supporting mapping of input data to a resulting vector and the use of the resulting vector for executing instructions for a predictive model, according to another embodiment of the present disclosure. The system 600 of FIG. 6 is similar to the system 100 of FIG. 1. However, the co-processor IC 120 now includes an additional interface circuit 642, and the vector mapping sub-system 130 includes an additional memory controller IC 632 controlling access to an additional memory 634. The interface circuit 642 communicates with the memory controller IC 632 through the communication channel 690.

The vectors 136 stored by the upper memories 134 may be vector representations for one category of input data 144. The vectors 636 stored by the lower memory 634 may be vector representations for another category of input data 144. For example, one category of input data can be natural language (e.g., Acme store), and another category of input data can be URLs.

This system 600 can process different categories of input data 144, and direct the generated memory addresses to different memory controller ICs 132 or 632 depending on the category of the input data. The input data processing unit 126 can determine the category of the input data. If the category of the input data 144 is one category, the memory address(es) generated from the input data 144 can be provided to the upper memory controllers 132. On the other hand, if the category of the input data 144 is a different category, the memory address(es) generated from the input data 144 can be provided to the lower memory controller IC 632. The resulting vector returned by the memory controller ICs 132 or 632 is then used for execution of the instructions 122 of the predictive model to generate a prediction.

Figure 7:
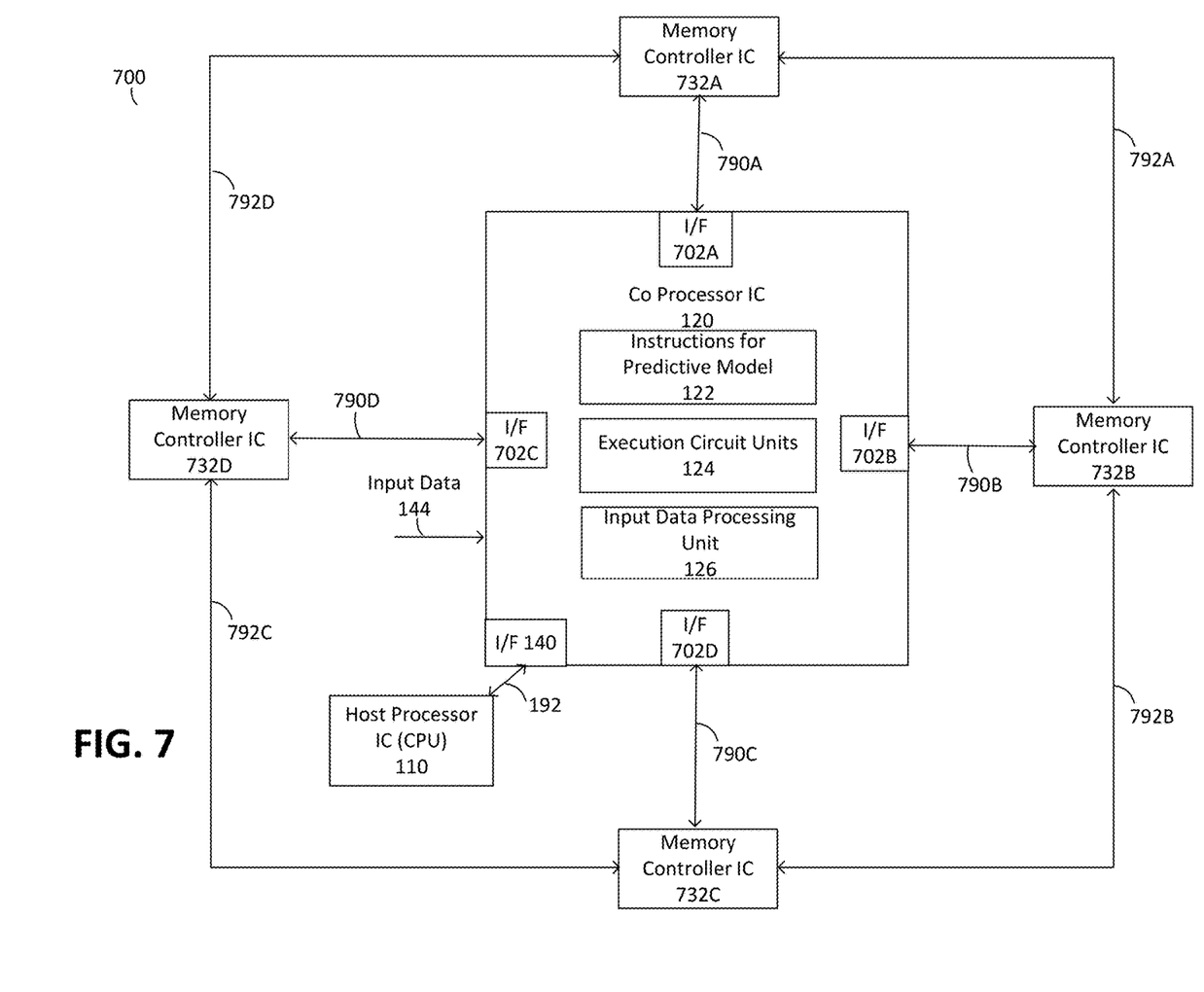
FIG. 7 is a block diagram of a computing system supporting mapping of input data to a resulting vector and the use of the resulting vector for executing instructions for a predictive model, according to a further embodiment of the present disclosure.

FIG. 7 is a block diagram of a computing system supporting mapping of input data to a resulting vector and the use of the resulting vector for executing instructions for a predictive model, according to a further embodiment of the present disclosure. The system 700 of FIG. 7 is similar to the system 100 of FIG. 1. However, the memory controller ICs 732A-D of the vector mapping sub-system are now organized in a ring configuration. Each memory controller IC 732A-D can control its own corresponding memory (not shown in FIG. 7) that stores vectors.

Each memory controller IC 732A-D can communication directly with the co-processor IC through a corresponding communication channel 790A-D. The co-processor IC 120 has separate interface circuits 702A-D for communicating across the communication channels 790A-D. Each memory controller IC 732A-D can also communicate directly with two adjacent memory controllers in the ring through additional communication channels 792A-D. This ring configuration may be more allow for more efficient communication of vectors in some circumstances.

Additional Configuration Information

One or more embodiments disclosed herein may result in increased processor performance (e.g., co-processor IC performance) and/or more efficient usage of communication channel bandwidth in a computing system. The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A method comprising:
dividing input data into a first word and a second word;
generating an extended first word that includes the first word and an indication of an order of the first word in the input data; and
generating an extended second word that includes the second word and an indication of an order of the second word in the input data;
providing the at least one memory address to a vector mapping sub-system, wherein the at least one memory address includes a first memory address generated from the extended first word and a second memory address generated from the extended second word;
generating, by the vector mapping sub-system, a resulting vector based on the at least one memory address, the resulting vector being a fixed length vector representation of the input data;
and
executing, by a processor, one or more instructions for a predictive model using the resulting vector to generate a prediction.

2. The method of claim 1, wherein generating the resulting vector comprises:
retrieving, by the vector mapping sub-system, the resulting vector from memory of the vector mapping sub-system based upon the first memory address.

3. The method of claim 1, wherein generating the resulting vector comprises:
retrieving, by the vector mapping sub-system, a first vector from at least one memory of the vector mapping sub-system using the first memory address;
retrieving, by the vector mapping sub-system, a second vector from the at least one memory of the vector mapping sub-system using the second memory address; and
combining, by the vector mapping sub-system, at least the first vector and the second vector into the resulting vector.

4. The method of claim 3, wherein combining, by the vector mapping sub-system, the first vector and the second vector comprises performing an addition, subtraction, multiplication, bitwise AND, bitwise OR, or vector cross product with the first vector and the second vector.

5. The method of claim 3, wherein the first vector, the second vector, and the resulting vector are all of a same length.

6. The method of claim 3, wherein the vector mapping sub-system includes a first memory and a second memory,
wherein retrieving the first vector comprises retrieving, from the first memory, the first vector using the first memory address; and
wherein retrieving the second vector comprises retrieving, by the second memory controller IC from the second memory, the second vector using the second memory address.

7. The method of claim 1,
wherein generating the at least one memory address from the input data comprises hashing the extended first word into the first memory address with a hash function.

8. The method of claim 1, wherein the vector mapping sub-system includes that controls a first memory and a second memory, the method further comprising:
determining a category of the input data;
wherein responsive to the category of the input data being a first category, the at least one memory address is provided to the first memory; and responsive to the category of the input data being a second category, the at least one memory address is provided to the second memory.

9. The method of claim 1, wherein the input data represents a text string.

10. A system for processing input data for a predictive model, the system comprising:
   a processor to:
      divide the input data into a first word and a second word;
      generate an extended first word that includes the first word and an indication of an order of the first word in the input data;
      generate an extended second word that includes the second word and an indication of an order of the second word in the input data; and
      execute one or more instructions for the predictive model using a resulting vector to generate a prediction;
   a vector mapping sub-system to:
      generate the resulting vector based on at least one memory address that includes a first memory address generated from the extended first word and a second memory address generated from the extended second word, the resulting vector being a fixed length vector representation of the input data.

11. The system of claim 10, wherein the vector mapping sub-system is configured to generate the resulting vector by retrieving the resulting vector from memory of the vector mapping sub-system based upon the first memory address.

12. The system of claim 10, wherein the vector mapping sub-system is configured to generate the resulting vector by:
   retrieving a first vector of numbers from at least one memory of the vector mapping sub-system using the first memory address;
   retrieving a second vector of numbers from the at least one memory of the vector mapping sub-system using the second memory address; and
   combining at least the first vector and the second vector into the resulting vector.

13. The system of claim 12, wherein the vector mapping sub-system is configured to combine the first vector and the second vector by performing an addition, subtraction, multiplication, bitwise AND, bitwise OR, or vector cross product with the first vector and the second vector.

14. The system of claim 12, wherein the first vector, the second vector, and the resulting vector are all of a same length.

15. The system of claim 12, wherein the vector mapping sub-system includes a first memory and a second memory:
   wherein the vector mapping sub-system is configured to retrieve the first vector from the first memory using the first memory address; and
   wherein the vector mapping sub-system is configured to retrieve the second vector from the second memory using the second memory address.

16. The system of claim 10, wherein the processor IC is configured to generate the at least one memory address associated with the input data by hashing the first extended word into the at first memory address with a hash function.

17. The system of claim 10, wherein the vector mapping sub-system includes a first memory and a second memory, and the processor is configured to:
   determine a category of the input data;
   provide, responsive to the category of the input data being a first category, the at least one memory address to the first memory; and
   provide, responsive to the category of the input data being a second category, the at least one memory address to the second memory.

18. The system of claim 10, wherein the vector mapping sub-system includes a plurality of memory controller ICs organized in a ring configuration.

* * * * *

UNITED STATES PATENT AND TRADEMARK OFFICE
CERTIFICATE OF CORRECTION

PATENT NO. : 10,908,900 B1  
APPLICATION NO. : 16/277817  
DATED : February 2, 2021  
INVENTOR(S) : Jonathan Alexander Ross Page 1 of 1

It is certified that error appears in the above-identified patent and that said Letters Patent is hereby corrected as shown below:

In the Claims

In Column 10, in Claim 8, Line 62, after "sub-system includes" delete "that controls".

In Column 12, in Claim 16, Line 23, after "into the" delete "at".

Signed and Sealed this  
Third Day of August, 2021

Drew Hirshfeld  
*Performing the Functions and Duties of the  
Under Secretary of Commerce for Intellectual Property and  
Director of the United States Patent and Trademark Office*